(12) United States Patent
Abd Elhamid et al.

(10) Patent No.: US 9,011,667 B2
(45) Date of Patent: Apr. 21, 2015

(54) NANOTUBE ASSEMBLY, BIPOLAR PLATE AND PROCESS OF MAKING THE SAME

(75) Inventors: Mahmoud H. Abd Elhamid, Grosse Pointe Woods, MI (US); Gayatri Vyas Dadheech, Rochester Hills, MI (US); Curtis A. Wong, Macomb Township, MI (US); Youssef M. Mikhail, Sterling Heights, MI (US); Michael J. Lukitsch, Marysville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1168 days.

(21) Appl. No.: 11/862,644

(22) Filed: Sep. 27, 2007

(65) Prior Publication Data

US 2009/0087716 A1     Apr. 2, 2009

(51) Int. Cl.
| | |
|---|---|
| C25D 11/26 | (2006.01) |
| C25D 11/18 | (2006.01) |
| C25D 11/02 | (2006.01) |
| C23C 28/00 | (2006.01) |
| B82Y 30/00 | (2011.01) |
| C01G 23/04 | (2006.01) |
| C01G 25/02 | (2006.01) |
| C01G 27/02 | (2006.01) |
| C01G 33/00 | (2006.01) |
| C01G 35/00 | (2006.01) |

(Continued)

(52) U.S. Cl.
CPC ............ *C23C 28/00* (2013.01); *B82Y 30/00* (2013.01); *C01G 23/04* (2013.01); *C01G 25/02* (2013.01); *C01G 27/02* (2013.01); *C01G 33/00* (2013.01); *C01G 35/00* (2013.01); *C01P 2004/03* (2013.01); *C01P 2004/13* (2013.01); *C01P 2006/40* (2013.01); *C25D 11/26* (2013.01); *H01M 8/023* (2013.01); *H01M 8/0245* (2013.01); *H01M 8/04291* (2013.01); *H01M 8/1004* (2013.01); *Y02E 60/50* (2013.01); *C23C 28/322* (2013.01); *C23C 28/34* (2013.01); *C23C 28/341* (2013.01); *C23C 28/345* (2013.01); *C23C 28/3455* (2013.01)

(58) Field of Classification Search
CPC ........ B82Y 30/00; C25D 11/26; C25D 11/02; C25D 11/04
USPC ........................................................ 205/320
See application file for complete search history.

(56) References Cited

U.S. PATENT DOCUMENTS

| | | | |
|---|---|---|---|
| 3,134,689 A | | 5/1964 | Pritikin et al. |
| 3,177,131 A | * | 4/1965 | Deriaz et al. .................. 205/535 |

(Continued)

FOREIGN PATENT DOCUMENTS

| | | |
|---|---|---|
| CN | 1753219 | 3/2006 |
| CN | 1974875 | 6/2007 |

(Continued)

OTHER PUBLICATIONS

Disclosed Anonymously. A bipolar plate for PEM fuel cells with enhanved water management (GP-305 381). Research Disclosure Database No. 485052 Research Disclosure Journal, Sep. 10, 2004.*

(Continued)

*Primary Examiner* — James Lin
*Assistant Examiner* — Brian W Cohen
(74) *Attorney, Agent, or Firm* — BrooksGroup

(57) ABSTRACT

One embodiment of the invention includes an assembly of metal oxide comprising valve metal oxide nanotubes.

13 Claims, 4 Drawing Sheets

(51) Int. Cl.
*H01M 8/02* (2006.01)
*H01M 8/04* (2006.01)
*H01M 8/10* (2006.01)

(56) References Cited

U.S. PATENT DOCUMENTS

| | | | |
|---|---|---|---|
| 3,445,353 A * | 5/1969 | Harendza-Harinxma | 205/322 |
| 3,915,838 A * | 10/1975 | Lee | 204/290.08 |
| 4,272,353 A | 6/1981 | Lawrence | |
| 5,595,638 A * | 1/1997 | Konuma et al. | 205/96 |
| 6,649,031 B1 * | 11/2003 | Iqbal et al. | 204/192.15 |
| 6,914,008 B2 * | 7/2005 | Den et al. | 438/707 |
| 7,011,737 B2 * | 3/2006 | Varghese et al. | 205/189 |
| 7,348,194 B2 | 3/2008 | Chacko et al. | |
| 2002/0104761 A1 * | 8/2002 | Birss et al. | 205/102 |
| 2003/0228512 A1 * | 12/2003 | Vyas et al. | 429/38 |
| 2003/0235711 A1 * | 12/2003 | Seido et al. | 428/660 |
| 2004/0197661 A1 * | 10/2004 | Utsunomiya et al. | 429/247 |
| 2004/0247978 A1 * | 12/2004 | Shimamune | 429/34 |
| 2005/0255315 A1 | 11/2005 | Yamanaka et al. | |
| 2006/0105222 A1 | 5/2006 | Elhamid et al. | |
| 2006/0196774 A1 * | 9/2006 | Liu et al. | 205/96 |
| 2006/0229715 A1 * | 10/2006 | Istephanous et al. | 623/1.46 |
| 2010/0290974 A1 * | 11/2010 | Hu et al. | 423/395 |

FOREIGN PATENT DOCUMENTS

| | | |
|---|---|---|
| EP | 1726567 A1 * | 11/2006 |
| WO | WO 2005090236 A1 * | 9/2005 |
| WO | 2007061945 A2 | 5/2007 |

OTHER PUBLICATIONS

Varghese, O.K.; Gong, D.; Paulose, M.; Grines, C.A.; Dickey, E.C.: Crystallization and high-temperature structural stability of titanium oxide nanotube arrays. Journal of Materials Research, 2003, vol. 18, No. 1, p. 156-165.*

Gong, D.; Grimes, C.A.; Varghese, O.K.; Hu, W.; Singh, R.S.; Chen, Z.; Dickey, E.C.: Titanium oxide nanotube arrays prepared by anodic oxidation. Journal of Materials Research, 2001, vol. 16, No. 12, 3331-3334.*

Supramaniam Srinivasan et al, Recent Advances in Solid Polymer Electrolyte Fuel Cell Technology With Low Platinum Loading Electrodes, Journal of Power Sources, vol. 29, Issues 3-4, Feb. 1990, pp. 367-387.

Indian Office Action dated Jun. 17, 2013; Application No. 1774/kol/2008; Applicant: GM Global Technology Operations LLC; 1 page.

K. Yasuda et al., Mechanistic Aspect of the Self-Organization Process for Oxide Nanotube Formation on Valve Metals, Journal of the Electrochemical Society, 2007, 154, pp. C472-C478.

Jae-Sun Hwang et al., Titanium Oxide Layer with Micro and Nano Tubes on Titanium Substrate, Key Engineering Materials, 2006, 379, pp. 309-311.

Xi Liu et al., Synthesis of Au nanoclusters supported upon a TiO2 nanotube array, J. Mater. Res. 20, 2005 pp. 1093-1096.

G. K. Mor et al., Fabrication of hydrogen sensors with transparent titanium oxide nanotube-array thin films as sensing elements, Thin Solid Films, 2006, 496, pp. 42-48.

G.K. Mor et al., A review of highly ordered, vertically oriented TiO2 nanotube arrays: Fabrication, material properties, and solar energy applications; Solar Energy Materials & Solar Cells, 2006, 90, pp. 2011-2075.

German Office Action dated Oct. 18, 2013; Application No. 102008048632.9; Applicant: GM Global Technology Operations LLC, 5 pages.

* cited by examiner

NANOTUBE ASSEMBLY, BIPOLAR PLATE AND PROCESS OF MAKING THE SAME

TECHNICAL FIELD

The field to which the disclosure generally relates includes metal oxide nanotubes, bipolar plates, and fuel cells.

BACKGROUND

Nano-materials have been explored extensively as fundamental building blocks for advanced functional materials. Nanotubes, with large surface area and high aspect ratio, hold the most promise to provide unique and improved properties to new materials. Although there are many different processes of producing nanotubes, organizing and manipulating nanotubes into a particular assembly to create a real world structure at a product scale has been challenging.

A fuel cell has been recognized as one of most promising energy device due to its high energy efficiency and low emission. There are, however, many technical and economical challenges for commercial design and production of fuel cells. Nanomaterials, such as nanotubes, can potentially help overcome some of the challenges. Improvement of fuel cell bipolar plate, for example, is needed in the areas of corrosion resistance, water management capability and durability.

A fuel cell usually consists of a series of membrane electrode assemblies and bipolar plates stacked together in an alternating manner. The membrane electrode assembly is typically made of an ion conductive membrane sandwiched between an anode and a cathode sections each on the opposite side of the membrane. Bipolar plate is a plate like electric conductor having plurality of channels for fluid passage. The reactive gases flow through those channels to reach the anode and cathode sections where electrochemical reactions of the gases take place to generate electricity. The electricity generated from the electrochemical reactions is collected and conducted through the bipolar plate to an external circuit. The bipolar plate, therefore, needs to have high electric conductivity or low contact resistance to avoid energy loss. The bipolar plate also needs to meet very stringent corrosion resistance requirement due to the harsh environment created by the reactive gases, electrochemical reactions and contaminants generated from the membrane electrolyte in the process. In the case of a hydrogen fuel cell, water management is another key challenge. Water is continuously generated in a hydrogen fuel cell and the ion conductive membrane needs to maintain a certain hydration level. When a hydrogen fuel cell is operated at a low current density, for example, at $0.2 A/cm^2$, there would not be enough gas flow to remove the water generated at the cathode section. Water drops can form in the fluid passages and block the flow of reactive gas. Without the supply of reactant gas, the blocked section of the fuel cell will not produce electricity. Performance of the fuel cell will deteriorate due to non-homogeneous current distribution. Such phenomenon is known as low power stability (LPS). Although there are several recent approaches to improve LPS by making the plate channel surface hydrophilic to spread out condensed water, further improvement in water management is desired.

SUMMARY OF EXEMPLARY EMBODIMENTS OF THE INVENTION

In one embodiment, an assembly comprises a plurality of valve metal oxide nanotubes. Valve metal may comprise at least one of titanium, zirconium, niobium, tantalum, hafnium or mixtures or alloys thereof. The valve metal oxide nanotube may be produced to provide photocatalytic activity.

In another embodiment, a bipolar plate having plurality of channels configured for fluid passages is provided. The bipolar plate comprises a valve metal plate having a metal oxide nanotube assembly disposed on at least part of its surface. The metal oxide nanotube assembly provides improved water management in addition to corrosion resistance and electric conductivity.

Another embodiment of the invention includes a method of making a metal oxide nanotube assembly comprising: providing a valve metal selected from the group consisting titanium, zirconium, niobium, tantalum, hafnium or any mixtures thereof; anodizing said valve metal in an electrolyte solution to cause the formation of a nanotube assembly on the valve metal surface; and passivating said valve metal in an electrolyte solution at a anodizing potential or voltage such that the electric current flowing through the valve metal reaches a minimum level.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

Unless explicitly stated, the method embodiments described herein are not constrained to a particular order or sequence. Some of the described embodiments or elements thereof can occur or be performed at the same point in time.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Figure 1:
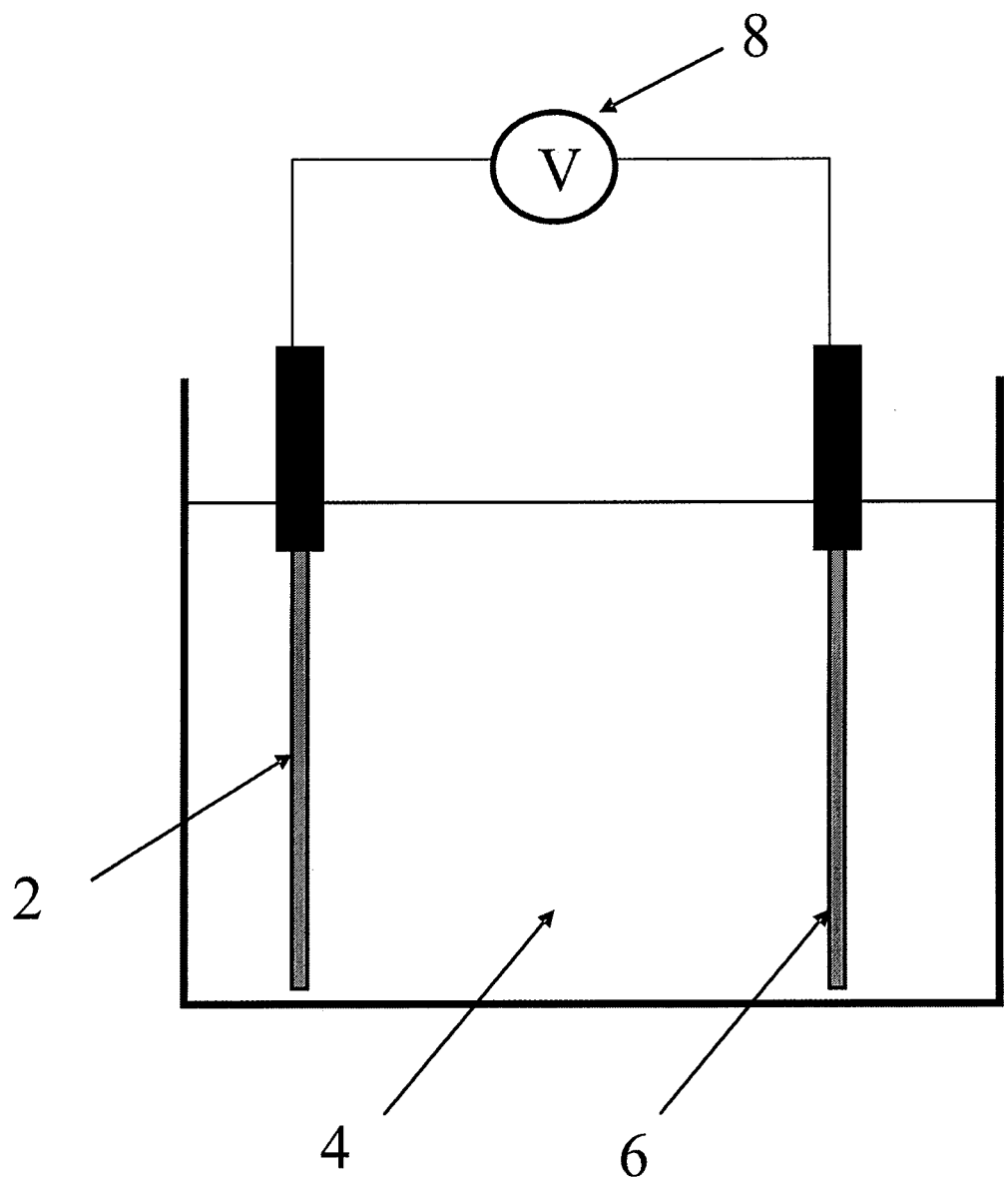
FIG. 1 is a schematic drawing of an exemplary electrochemical cell for anodizing and passivating a valve metal for the preparation of a metal oxide nanotube assembly.

The following description of the embodiment(s) is merely exemplary in nature and is in no way intended to limit the invention, its application, or uses.

Valve metals are metal materials that exhibit the property of forming an innate protective oxide layer on the metal surface, effectively protecting the metal from corrosion. Examples of valve metals include titanium, zirconium, niobium, tantalum, hafnium, or any mixtures or alloys thereof. The innate protective valve metal oxide films are typically thin and compact in structure. The innate oxide film thus has small surface area.

Nanotube is referred to herein as a tube like structure where the diameter of the tube ranges from 1 nanometer to 300 nanometers. The tube is general elongated. Nanotubes typically provide large surface area due to its hollow structure and small dimensions.

In one embodiment of this invention, a valve metal is anodized in an electrolyte solution at a sufficient electrochemical potential or a voltage. This may cause the roughening surface to occur, initially creating a porous surface. Either a two electrodes cell or a three electrodes cell may be used in the anodizing process. In a two electrodes cell, an anode and a cathode are immersed in an electrolyte solution and a controlled voltage is applied cross the two electrodes. A valve metal material is used as the anode. In a three electrodes cell, a reference electrode (such as silver/silver chloride reference electrode), a working electrode and a counter electrode are immersed in an electrolyte solution. The working electrode is a valve metal in the shape of a plate or other configurations. The counter electrode is typically an inert conductive material such as platinum or graphite. The electrochemical potential is applied to the working electrode by controlling the voltage between the reference electrode and the working electrode. There is minimal, if any, current flowing through the reference electrode. The current generated from the anodizing process flows only between the working electrode and the counter electrode. The potential of the working electrode is thus set at the oxidation potential of the valve metal or beyond to cause anodization of the valve metal surface. Relative large current flow may be created in the initial stage to initiate the surface roughening. Further anodization induces the formation of an ordered assembly of metal oxide nanotubes and the passivation of the valve metal surface. Electric current typically drops when an assembly of nanotubes is formed. The current drops to a minimal level as the valve metal surface is passivated. The valve metal surface may be substantially covered with such a corrosion resistant metal oxide nanotube assembly. The nanotubes in the assembly may be substantially parallel to each other and interconnected in a side-by-side manner. Not only an assembly of relative uniform metal oxide nanotubes is prepared, but also a valve metal material passivated with excellent corrosion resistant protective layer is obtained.

The electrolyte used in the anodizing process may include any materials that can provide ionic conductivity and electrochemical stability at the anodizing conditions. The electrolyte typically comprises an aqueous solution of an organic or inorganic acid or salt. A mixture of different salts and acids may also be used. In one embodiment, an electrolyte solution containing an ion that is capable of at least partially penetrating the innate valve metal oxide film and/or forming a complex with the valve metal ion may be used to induce the initial surface roughening in the anodizing process to facilitate the formation of nanotubes. The electrolyte solution may comprise chloride, fluoride, or oxalate ions.

FIG. 1 shows a schematic drawing of an anodizing process using a two electrodes cell where a valve metal anode 10 and a cathode 30 are immersed in an electrolyte solution 20. A controlled voltage 40 is applied cross the two electrodes such that the valve metal is oxided electrochemically. In one embodiment, a titanium coupon is used as the anode and a stainless steel plate is used as the cathode. The two electrodes were immersed in a 0.2 M hydrogen fluoride aqueous solution. A 20 volts voltage was applied between the anode and the cathode for 15 minutes at room temperature. The current spikes rapidly when the voltage was first applied. The current decreases subsequently and reached a minimal level when the coupon surface is passivated with an assembly of titanium oxide nanotubes.

Figure 2:
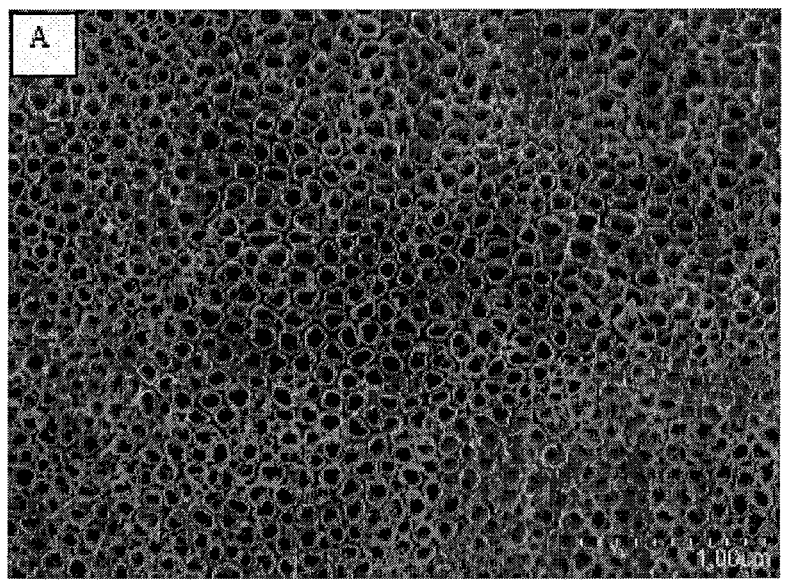
FIG. 2 shows field emission scanning electron micrographs of a top-view and a cross-sectional view of a valve metal oxide nanotube assembly.
Figure 2:
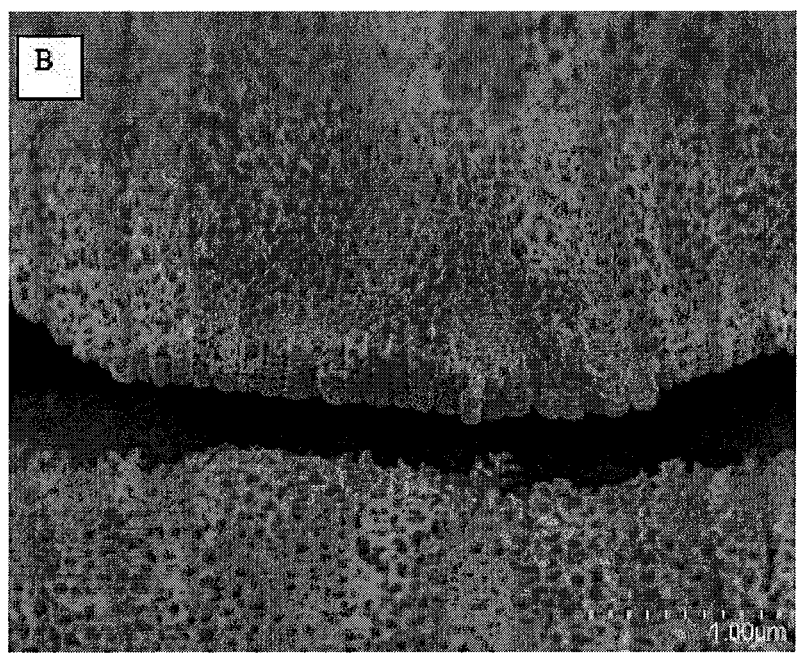
Figure 3:
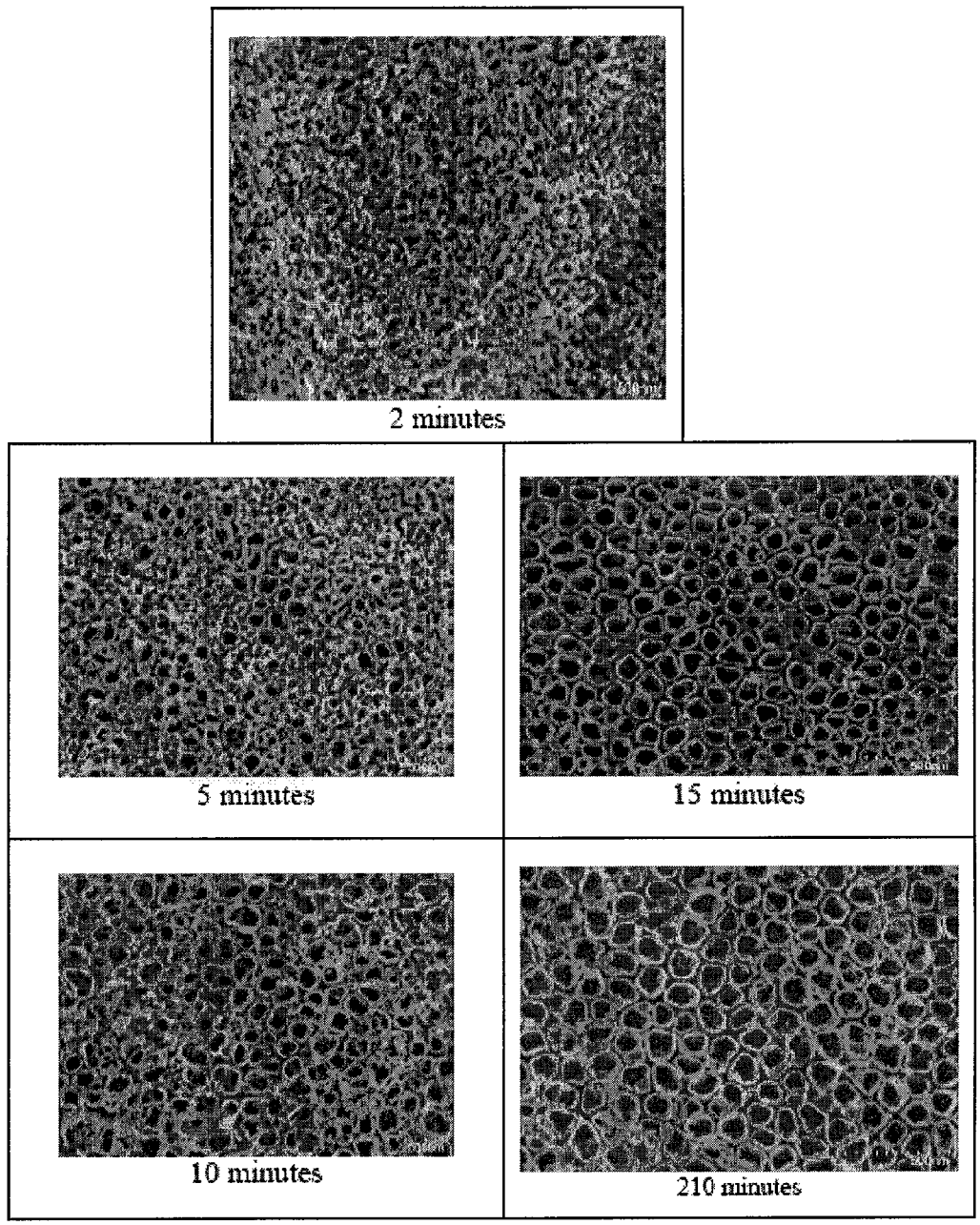
FIG. 3 shows several field emission scanning electron micrographs of a valve metal oxide nanotube assembly produced at different stages of an anodizing process.

FIG. 2 shows the field emission scanning electron micrographs of the titanium coupon surface after the anodizing process. Micrograph A shows a top view of the assembly of titanium oxide nanotubes formed from the anodizing process. Micrograph B is a cross-sectional view of the same nanotube assembly. The average diameter of the titanium oxide nanotube is about 60-75 nanometers (nm), and the length of the nanotube ranges from about 15 nm to about 300 nm. In a similar but separate experiment, a titanium coupon anode and a stainless steel cathode were immersed in a 0.2 M hydrogen fluoride solution at room temperature. 20 V was applied cross the anode and the cathode, and the titanium anode surface was examined using field emission scanning electron microscope at different point of time after the application of the voltage. FIG. 3 shows the field emission electron micrographs of the titanium electrode surface at different time points. As shown in the FIG. 3, at 2 minutes and within the initial stage, surface roughening is clearly visible. At 5 minutes, some titanium oxide nanotubes are formed sporadically cross the surface. At 10 minutes, an assembly of nanotubes covers virtually the entire surface. At 15 and 210 minutes, the nanotubes stabilized with only slight increase in nanotube diameter, indicating substantial passivation of the metal surface. An assembly of parallel and interconnected titanium oxide nanotubes is thus produced. A titanium metal passivated with an assembly of titanium dioxide nanotubes is also obtained.

The assembly of valve metal oxide nanotubes has very large surface area compared to an innate compact oxide film. The assembly thus exhibit excellent properties of a catalyst or a carrier for a catalyst. In one embodiment, an assembly of titanium oxide nanotubes is produced as described above. The assembly of titanium oxide nanotubes exhibits photocatalytic activity. Additionally, an assembly of anatase rich crystalline (from 50% to about 99%) form of titanium dioxide nanotubes may be produced for high photocatalytic activity. Anatase is one of the 3 crystal forms of titanium dioxide (rutile, anatase and brookite). An assembly of anatase rich form of the titanium dioxide nanotubes may be obtained by calcination of the assembly described above to a temperature between 300° C. and about 700° C. As a photocatalyst, titanium dioxide can carry out hydrolysis, i.e., break water into hydrogen and oxygen when exposed to UV light. The hydrogen collected from the process can be used as a fuel. The efficiency of this process can be greatly improved by doping the oxide with carbon, nitrogen, or other elements. The assembly of photocatalytic nanotubes can also be used as self-cleaning surfaces such as automobile windshield surfaces.

The assembly of valve metal oxide nanotubes prepared from anodization increases the corrosion resistance and wear resistance of a valve metal, and provides better adhesion for paint primers and glues than bare metal. The assembly of nanotubes described above is generally much stronger and more adherent than most paints and platings, making them less likely to crack and peel.

In yet another embodiment, a bipolar plate for fuel cells is prepared by forming on the surface of the plate an assembly of valve metal oxide nanotubes. A thin valve metal plate, such as a titanium metal plate, is first stamped to form a plurality of channels as passage for fluids such as reactive gases. The valve metal is then anodized in an electrolyte solution as described above to form an assembly of valve metal oxide nanotubes on its surface. A bipolar plate produced in this manner exhibits not only excellent corrosion resistance, but improved water management property. In one exemplary embodiment, a thin titanium metal sheet is stamped with a pattern of gas flow channels. The stamped titanium plate as an anode is then immersed in a 0.2 M hydrogen fluoride aqueous solution along with a stainless steel cathode. A 20 V may be then applied cross the two electrodes for about 15 minutes to form an assembly of titanium oxide nanotubes on the bipolar plate surface. The bipolar plate exhibits a water contact angle of less than 15 degree immediately after the formation of the nanotube assembly. The bipolar plate is left in open air in a laboratory environment for about one week to test the robustness of the surface against air contaminants which typically would increase the water contact angle substantially. The contact angle after one week exposure to laboratory air only increases slightly to about 22 degree. Such a low water contact angle indicates the robustness of the assembly to provide water management property to a bipolar plate and a significant improvement in LPS (low power stability) to a fuel cell. Although the Applicants do not wish to be bound by or to a particular theory, it is believed that the large surface area and the nano-porous structure of the assembly which is augmented by the oxide chemistry which tends to retain water, afford such improved water management performance. The assembly not only efficiently spreads out water drops to prevent clogging of gas flow channels, but also absorbs a thin layer of water within its porous structure.

The electric contact resistance of the bipolar plate described above can be improved by coating a thin layer of noble metal, carbon, metal carbide, metal nitride or a conductive oxide. The conductive coating is applied to provide a surface contact resistance of less than about 50 milli-ohms centimeter square(mohm $cm^2$), or preferably less than 10 mohm/$cm^2$. Noble metals are metals that are resistant to corrosion or oxidation, unlike most base metals. Examples of noble metal include gold, silver, tantalum, platinum, palladium and rhodium. Any oxides that exhibit high electric conductivity and corrosion resistance may also be used to improve the contact resistance of the bipolar plate. Mixed metal oxides, single metal oxides, and doped metal oxides may be deposited on the bipolar plate by chemical vapor deposition, vacuum deposition, spattering, ion plating, spray, dip-coating, atomic layer deposition and the like. Non-limiting examples of conductive metal coating include fluorine doped tin oxide, tantalum doped titanium dioxide, niobium doped titanium dioxide, iridium oxide, ruthenium oxide, mixed oxide of titanium and ruthenium, and titanium oxide with oxygen vacancies. In one particular embodiment, a titanium bipolar plate having a titanium oxide nanotube assembly is prepared as described above. The contact resistance of the bipolar plate is about 380 mohm/$cm^2$ on a sample to paper measurement. The bipolar plate is then dip coated using a 3 wt % ruthenium chloride in ethanol solution, followed by drying and calcination at 450° C. for 15 minutes to convert ruthenium chloride into ruthenium oxide. The resulting bipolar plate has a contact resistance ranged from about 6 to 8 mohm $cm^2$.

The assembly of nanotubes may comprise mixture of at least two different metal oxides. For example, a metal alloy may be anodized in the method described above. The metal oxide nanotubes formed from the alloy thus comprise a mixture of metal oxides with composition similar to the innate oxide layer of the alloy. The composition of the assembly of nanotubes can be varied by using different metal alloys as the anode material. By varying the composition, a mixed oxide with excellent corrosion resistance and electric conductivity can be prepared. Examples of electric conductive mixed oxides may include any mixtures of titanium oxide, ruthenium oxide, tantalum oxide, and niobium oxide.

The conductive coating and/or the assembly of metal oxide nanotubes may be formed on the entire surface of a bipolar plate or selectively on the surface of gas flow channels or surface contact areas. To form a conductive coating or assembly on selected areas of the bipolar plate, the areas that are not to be treated can be masked first with a mask template or a removable protective layer. An example of selective deposition process for preparing a bipolar plate is described in a U.S. Patent Application Publication No. 20060105222.

Figure 4:
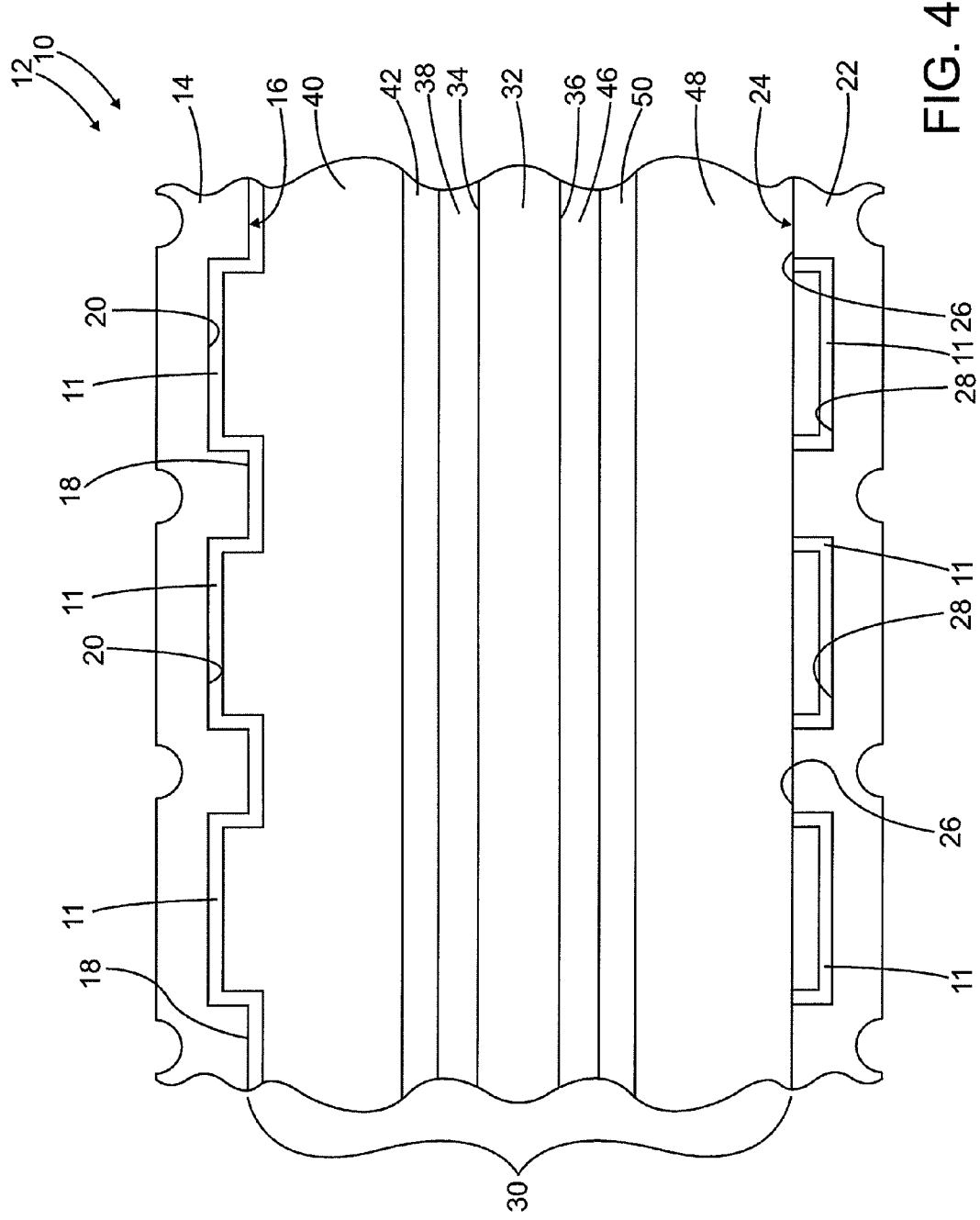
FIG. 4 shows a schematic drawing of a cross-section view of a fuel cell according to one embodiment of the invention.

Referring now to FIG. 4, one embodiment of the invention includes a product 10 comprising a fuel cell 12. The fuel cell 12 may include a first fuel cell bipolar plate 14 including a first face 16 having a reactant gas flow field defined therein by a plurality of lands 18 and channels 20. The reactant gas flow field may deliver a fuel on one side of the bipolar plate and an oxidant on the other side of the bipolar plate. The surface of the lands 18 may include a conductive coating or bare metal surface. The conductive coating may be a thin layer of noble metal, carbon, metal carbide, metal nitride or a conductive oxide as described above. The bipolar plate may be prepared by stamping a thin sheet of valve metal such as titanium sheet to form a designed pattern of channels 20 for fluid passages.

According to one embodiment of the invention, the entire surface including the lands 18 and the channels 20 may be coated with a coating 11 including an assembly of valve metal oxide nanotubes and optionally a conductive coating. The fuel cell 12 may also include a second fuel cell bipolar plate 22 including a first face 24 having a reactant gas flow field defined therein by a plurality of lands 26 and channels 28. The lands 18 or 16 and the channels 20 or 28 may be formed in the bipolar plate 14 or 22 by machining, etching, stamping, molding or the like. According to another embodiment, a coating 11 including an assembly of valve metal oxide nanotubes is selectively deposited on portions of the bipolar plate 22, for example only on the surface defining the channel 28 formed in the bipolar plate 22. A ruthenium oxide, gold or carbon conductive coating layer may be deposited on the lands 18, by chemical coating, calcinations, vacuum deposition, spattering, or other deposition methods know to an ordinary skill in the art.

A soft goods portion 30 may be provided between the first fuel cell bipolar plate 14 and the second fuel cell bipolar plate 22. The first fuel cell bipolar plate 14 and the second fuel cell bipolar plate 22 may include a variety of materials including, but not limited to, a metal, metal alloy, and/or electrically conductive composite. In one embodiment of the invention, the first fuel cell bipolar plate 14 and the second fuel cell bipolar plate 22 may be stainless steel.

The soft goods portion 30 may include a polymer electrolyte membrane 32 comprising a first face 34 and a second face 36. A cathode electrode may overlie the first face 34 of the polymer electrolyte membrane 32. A first gas diffusion media layer 40 may overlie the cathode electrode 38, and optionally a first microporous layer 42 may be interposed between the first gas diffusion media layer 40 and the cathode electrode 38. The first gas diffusion media layer 40 may be hydrophobic. The first bipolar plate 14 may overlie the first gas diffusion media layer 40. If desired, a hydrophilic layer (not shown) may be interposed between the first fuel cell bipolar plate 14 and the first gas diffusion media layer 40.

An anode electrode 46 may underlie the second face 36 of the polymer electrolyte membrane 32. A second gas diffusion media layer 48 may underlie the anode layer 46, and optionally a second microporous layer 50 may be interposed between the second gas diffusion media layer 48 and the anode electrode 46. The second gas diffusion media layer 48 may be hydrophobic. The second fuel cell bipolar plate 22 may overlie the second gas diffusion media layer 48. If desired, a second hydrophilic layer (not shown) may be interposed between the second fuel cell bipolar plate 22 and the second gas diffusion media layer 48.

In various embodiments, the polymer electrolyte membrane 32 may comprise a variety of different types of membranes. The polymer electrolyte membrane 32 useful in various embodiments of the invention may be an ion-conductive material. Examples of suitable membranes are disclosed in U.S. Pat. Nos. 4,272,353 and 3,134,689, and in the Journal of Power Sources, Volume 28 (1990), pages 367-387. Such membranes are also known as ion exchange resin membranes. The resins include ionic groups in their polymeric structure; one ionic component for which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cationic exchange, proton conductive resins is the so-called sulfonic acid cationic exchange resin. In the sulfonic acid membranes, the cationic exchange groups are sulfonic acid groups which are attached to the polymer backbone.

The formation of these ion exchange resins into membranes or chutes is well-known to those skilled in the art. The preferred type is perfluorinated sulfonic acid polymer electrolyte in which the entire membrane structure has ionic exchange characteristics. These membranes are commercially available, and a typical example of a commercial sulfonic perfluorocarbon proton conductive membrane is sold by E. I. DuPont D Nemours & Company under the trade designation NAFION. Other such membranes are available from Asahi Glass and Asahi Chemical Company. The use of other types of membranes, such as, but not limited to, perfluorinated cation-exchange membranes, hydrocarbon based cation-exchange membranes as well as anion-exchange membranes are also within the scope of the invention.

In one embodiment, the first gas diffusion media layer 40 or the second gas diffusion media layer 48 may include any electrically conductive porous material. In various embodiments, the gas diffusion media layer may include non-woven carbon fiber paper or woven carbon cloth which may be treated with a hydrophobic material, such as, but not limited to, polymers of polyvinylidene fluoride (PVDF), fluroethylene propylene, or polytetrafluoroethylene (PTFE). The gas diffusion media layer may have an average pore size ranging from 5-40 micrometers. The gas diffusion media layer may have a thickness ranging from about 100 to about 500 micrometers.

In one embodiment, the electrodes (cathode layer and anode layer) may be catalyst layers which may include catalyst particles such as platinum, and an ion conductive material such as a proton conducting ionomer, intermingled with the particles. The proton conductive material may be an ionomer such as a perfluorinated sulfonic acid polymer. The catalyst materials may include metals such as platinum, palladium, and mixtures of metals such as platinum and molybdenum, platinum and cobalt, platinum and ruthenium, platinum and nickel, platinum and tin, other platinum transition-metal alloys, and other fuel cell electrocatalysts known in the art. The catalyst materials may be finely divided if desired. The catalyst materials may be unsupported or supported on a variety of materials such as but not limited to finely divided carbon particles.

In one embodiment, the cathode electrode 38 and the anode electrode 46 may be catalyst layers which may include catalyst particles such as platinum, and an ion conductive material such as a proton conducting ionomer, intermingled with the particles. The proton conductive material may be an ionomer such as a perfluorinated sulfonic acid polymer. The catalyst materials may include metals such as platinum, palladium, and mixtures of metals such as platinum and molybdenum, platinum and cobalt, platinum and ruthenium, platinum and nickel, platinum and tin, other platinum transition-metal alloys, and other fuel cell electrocatalysts known in the art. The catalyst materials may be finely divided if desired. The catalyst materials may be unsupported or supported on a variety of materials such as but not limited to finely divided carbon particles.

In one embodiment, the first microporous layer 42 or the second microporous layer 50 may be made from materials such as carbon blacks and hydrophobic constituents such as polytetrafluoroethylene (PTFE) and polyvinylidene fluoride (PVDF), and may have a thickness ranging from about 2 to about 100 micrometers. In one embodiment the microporous layer may include a plurality of particles, for example including graphitized carbon, and a binder. In one embodiment the binder may include a hydrophobic polymer such as, but not limited to, polyvinylidene fluoride (PVDF), fluoroethylene propylene (FEP), polytetrafluoroethylene (PTFE), or other organic or inorganic hydrophobic materials. The particles and binder may be included in a liquid phase which may be, for example, a mixture of an organic solvent and water to provide dispersion. In various embodiments, the solvent may include at least one of 2-propanol, 1-propanol or ethanol, etc. The dispersion may be applied to a fuel cell substrate, such as, a gas diffusion media layer or a hydrophobic coating over the gas diffusion media layer. In another embodiment, the dispersion may be applied to an electrode. The dispersion may be dried (by evaporating the solvent) and the resulting dried microporous layer may include 60-90 weight percent particles and 10-40 weight percent binder. In various other embodiments, the binder may range from 10-30 weight percent of the dried microporous layer.

The above description of embodiments of the invention is merely exemplary in nature and, thus, variations thereof are not to be regarded as a departure from the spirit and scope of the invention.

What is claimed is:

1. A method of making a metal oxide nanotube assembly comprising:
   providing a substrate comprising stainless steel;
   providing a valve metal on the substrate, the valve metal comprising at least one of titanium, zirconium, niobium, tantalum, hafnium or alloys or mixtures thereof;
   anodizing said valve metal in an electrolyte solution to cause the formation of a nanotube assembly on the valve metal surface and so that nanotubes of the nanotube assembly have an average diameter of 60-75 nm and a length ranging from 15-300 nm; and
   passivating said valve metal in an electrolyte solution at an anodizing potential or voltage such that the electric current flowing through the valve metal reaches a minimum level and the valve metal is corrosion resistant.

2. A method as set forth in claim 1 further comprising rinsing said valve metal to remove electrolyte solution.

3. A method as set forth in claim 1 wherein the anodizing further causing the surface to be roughened before the formation of a nanotube assembly.

4. A method as set forth in claim 1, wherein said valve metal is titanium.

5. A method as set forth in claim 1, wherein said electrolyte solution comprises an ion comprising at least one of chloride, fluoride, or cyanide.

6. A method as set forth in claim 1, wherein said electrolyte solution comprises at least one of hydrogen fluoride or a fluoride salt.

7. A method as set forth in claim 1 wherein the providing the valve metal on a substrate comprises cladding a thin foil of the valve metal on the substrate.

8. A method as set forth in claim 1 wherein the providing the valve metal on a substrate comprises depositing a thin layer of the valve metal on the substrate by physical vapor deposition.

9. A method as set forth in claim 1 further comprising calcinating the assembly of nanotube at a temperature ranging from 300-700 degrees Celsius to produce an anatase rich crystalline form of titanium nanotubes in the nanotube assembly.

10. A method as set forth in claim 1 wherein the electrolyte solution include hydrogen fluoride.

11. A method of making a metal oxide nanotube assembly comprising:
   providing a valve metal comprising at least one of titanium, zirconium, niobium, tantalum, hafnium or alloys or mixtures thereof;
   anodizing said valve metal in an electrolyte solution to cause the formation of a nanotube assembly on the valve metal surface; and
   passivating said valve metal in an electrolyte solution at an anodizing potential or voltage such that the electric current flowing through the valve metal reaches a minimum level and the valve metal is corrosion resistant;
   wherein the valve metal is a fuel cell bipolar plate having a reactant gas flow field defined in at least one face thereon, the flow field being defined by a plurality of lands and channels.

12. A method of making a metal oxide nanotube assembly comprising:
   providing a substrate comprising stainless steel;
   providing a valve metal on the substrate comprising at least one of titanium, zirconium, niobium, tantalum, hafnium or alloys or mixtures thereof;
   anodizing said valve metal in an electrolyte solution to cause the formation of a nanotube assembly on the valve metal surface; and
   passivating said valve metal in an electrolyte solution at an anodizing potential or voltage such that the electric current flowing through the valve metal reaches a minimum level and the valve metal is corrosion resistant;
   further comprising depositing a conductive coating on said nanotube assembly to provide a contact resistance of about 50 milli-ohms/cm$^2$ or less, and said conductive coating comprising a carbon, ruthenium oxide, rhodium oxide, platinum oxide, palladium oxide, osmium oxide, or iridium oxide.

13. A method of making a metal oxide nanotube assembly comprising:
   providing a substrate comprising stainless steel;
   providing a valve metal on the substrate comprising at least one of titanium, zirconium, niobium, tantalum, hafnium or alloys or mixtures thereof;
   anodizing said valve metal in an electrolyte solution to cause the formation of a nanotube assembly on the valve metal surface; and
   passivating said valve metal in an electrolyte solution at an anodizing potential or voltage such that the electric current flowing through the valve metal reaches a minimum level and the valve metal is corrosion resistant.

\* \* \* \* \*